(12) United States Patent
Lee et al.

(10) Patent No.: US 11,335,048 B1
(45) Date of Patent: May 17, 2022

(54) NEURAL NETWORK-BASED IMAGE COLORIZATION ON IMAGE/VIDEO EDITING APPLICATIONS

(71) Applicant: SONY CORPORATION, Tokyo (JP)

(72) Inventors: Jong Hwa Lee, San Diego, CA (US);
Moises Tafolla, San Diego, CA (US);
Praggya Garg, San Diego, CA (US);
Allison Langley, San Diego, CA (US);
Gary Lyons, San Diego, CA (US);
Alexander Stoneham, San Diego, CA (US); Seunghan Kim, San Diego, CA (US); Luis Vasconcelos, San Diego, CA (US)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 16/952,348

(22) Filed: Nov. 19, 2020

(51) Int. Cl.
*G06T 11/60* (2006.01)
*G06T 11/00* (2006.01)
(Continued)

(52) U.S. Cl.
CPC .......... *G06T 11/60* (2013.01); *G06F 3/04842* (2013.01); *G06F 3/04845* (2013.01); *G06N 3/02* (2013.01); *G06T 11/001* (2013.01)

(58) Field of Classification Search
CPC ...................................................... G06T 11/60
(Continued)

(56) References Cited

U.S. PATENT DOCUMENTS 5,200,816 A * 4/1993 Rose .................... H04N 1/6019
358/518
5,774,230 A * 6/1998 Goto ...................... H04N 1/603
358/518

(Continued)

FOREIGN PATENT DOCUMENTS

EP          3038059 A1    6/2016
WO      2020/005650 A1    1/2020

OTHER PUBLICATIONS

Zhang, et al., "Real-Time User-Guided Image Colorization with Learned Deep Priors", ACM Transactions on Graphics, vol. 36, No. 4, Jul. 2017, 11 pages.

(Continued)

*Primary Examiner* — Reza Nabi
(74) *Attorney, Agent, or Firm* — Chip Law Group (57) ABSTRACT

A computing system and method for neural network-based image colorization is provided. The computing system obtains a reference color image by selective application of a color effect on a region of interest of an input image and controls a display device to display a first node graph on a Graphical User Interface of an image/video editing application. The first node graph includes a colorization node representing a first workflow for colorization of at least a first object in grayscale images of a first image feed. The computing system selects the reference color image based on a user input and executes the first workflow associated with the colorization node by feeding the reference color image and the first image feed as an input to a neural network-based colorization model. The computing system receives a second image feed comprising colorized images as output of the neural network-based colorization model for the input.

20 Claims, 5 Drawing Sheets

(51) Int. Cl.
   *G06N 3/02* (2006.01)
   *G06F 3/04842* (2022.01)
   *G06F 3/04845* (2022.01)

(58) Field of Classification Search
   USPC .................................................... 382/100
   See application file for complete search history.

(56) References Cited

U.S. PATENT DOCUMENTS

| | | | | |
|---|---|---|---|---|
| 7,768,529 | B2* | 8/2010 | Kuo | G06T 7/13 345/619 |
| 8,724,894 | B1* | 5/2014 | Jensen | H04N 1/646 382/162 |
| 10,764,471 | B1* | 9/2020 | Wei | H04N 1/6072 |
| 10,892,050 | B2* | 1/2021 | Zhang | G06N 3/04 |
| 10,997,752 | B1* | 5/2021 | Yoo | G06T 11/00 |
| 2008/0144954 | A1* | 6/2008 | Chien | H04N 1/62 382/254 |
| 2009/0096807 | A1* | 4/2009 | Silverstein | G06T 11/001 345/593 |
| 2010/0085372 | A1* | 4/2010 | Levin | H04N 9/43 345/589 |
| 2011/0176726 | A1* | 7/2011 | Lee | H04N 1/40012 382/163 |
| 2013/0044123 | A1* | 2/2013 | Shah | G06F 8/38 345/594 |
| 2013/0236091 | A1* | 9/2013 | Ubillos | H04N 9/70 382/163 |
| 2015/0109323 | A1* | 4/2015 | Johnson | G06T 11/60 345/594 |
| 2015/0347858 | A1* | 12/2015 | Johnson | G06K 9/033 382/311 |
| 2016/0307306 | A1* | 10/2016 | Hoerentrup | G06T 5/50 |
| 2017/0061249 | A1* | 3/2017 | Estrada | G06T 5/005 |
| 2017/0061625 | A1* | 3/2017 | Estrada | G06N 3/0454 |
| 2017/0213112 | A1* | 7/2017 | Sachs | G06T 7/90 |
| 2019/0259136 | A1* | 8/2019 | Shpalensky | G06T 5/50 |
| 2019/0355154 | A1* | 11/2019 | Batra | G06T 7/90 |
| 2020/0242353 | A1* | 7/2020 | Zhang | G06K 9/00523 |
| 2021/0056355 | A1* | 2/2021 | Luss | G06N 3/0454 |
| 2021/0089777 | A1* | 3/2021 | Shrivastava | G06K 9/6215 |
| 2021/0112261 | A1* | 4/2021 | Hwang | H04N 19/42 |
| 2021/0133931 | A1* | 5/2021 | Lee | G06T 5/001 |
| 2021/0201071 | A1* | 7/2021 | Liao | G06T 11/001 |
| 2021/0224631 | A1* | 7/2021 | Zhu | G06T 5/001 |
| 2021/0241432 | A1* | 8/2021 | Li | G06T 5/008 |
| 2021/0319596 | A1* | 10/2021 | Lee | G06F 3/0484 |
| 2021/0321016 | A1* | 10/2021 | Flohr | G06T 5/001 |
| 2021/0325657 | A1* | 10/2021 | Serra Lleti | G06T 7/90 |
| 2021/0366082 | A1* | 11/2021 | Xiao | G06T 3/4046 |

OTHER PUBLICATIONS

Ci, et al., "User-Guided Deep Anime Line Art Colorization with Conditional Adversarial Networks", Proceedings of the 26th ACM international conference on Multimedia, Oct. 2018, pp. 1536-1544.
International Search Report of PCT Application No. PCT/IB2021/060716, dated Feb. 2, 2022, 3 pages of ISR.
Zhang, et al., "Deep Exemplar-based Video Colorization", Computer Vision and Pattern Recognition, XP081383517, Jun. 24, 2019, 15 pages.
Wang, et al "A State-of-the-Art Review on Image Synthesis With Generative Adversarial Networks", IEEE Access, XP011783483, vol. 8, Mar. 20, 2020, pp. 63514-63537.
Zang, et al., "Deep Exemplar-based Video Colorization", IEEE, Conference on Computer Vision and Pattern Recognition, XP033687329, Jun. 15, 2019, pp. 8052-8061.

* cited by examiner

FIG. 5

NEURAL NETWORK-BASED IMAGE COLORIZATION ON IMAGE/VIDEO EDITING APPLICATIONS

CROSS-REFERENCE TO RELATED APPLICATIONS/INCORPORATION BY REFERENCE

None.

FIELD

Various embodiments of the disclosure relate to image/video colorization. More specifically, various embodiments of the disclosure relate to a method and system for neural network-based image colorization on an image/video editing application.

BACKGROUND

Advancements in image/video editing applications have led to development of image colorization techniques which add color to one or more regions in a grayscale image/video. In conventional rotoscoping-based methods, a user has to manually place points around a region of interest in an image frame of a video. To colorize the entire sequence of frames in the video, the above process has to be repeated manually for every frame of the video. This may be time consuming and cumbersome for the user.

Limitations and disadvantages of conventional and traditional approaches will become apparent to one of skill in the art, through comparison of described systems with some aspects of the present disclosure, as set forth in the remainder of the present application and with reference to the drawings.

SUMMARY

A computing system and a method for neural network-based image colorization on image/video editing applications is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

The following described implementations may be found in the disclosed computing system and method for neural network-based image colorization on an image/video editing application. Exemplary aspects of the disclosure provide a computing system which implements a workflow using a neural network-based image colorization model for colorization of at least one object in one or more grayscale images of an image feed using a reference color image. Specifically, the neural network-based colorization model transfers a color effect on a region of interest in the reference color image to an object in each of the grayscale images of the image feed. Such an image feed may be a single image or may be a video with multiple images.

On the image/video editing application, a user may obtain a reference color image using a rotoscoping tool of the image/video editing application. For example, the user may adopt rotoscoping to change the color of a masked region of an image to obtain the reference color image. The same application provides a node-based interface to construct a node graph. For example, a user may simply add an image feed of grayscale images as a source node to a colorization node, the output of which may be linked to a result node. The colorization node may correspond to a software plugin (such as an OpenFX (OFX) plugin) which, when executed, may invoke the neural network-based colorization model to apply the color effect from the region of interest in the reference color image to object(s) in the grayscale image(s) of the image feed. The reference color image or a file path of the reference color image may be passed as input to the colorization node.

In conventional rotoscoping-based methods, a user has to manually set points around a region of interest in an image frame of a video. To colorize the entire sequence of frames in the video, the above process has to be repeated for every frame of the video. This may be time consuming and cumbersome. In contrast, the present disclosure doesn't require the user to mark any region of interest in every frame of a target grayscale video. The user may simply have to select a reference color image and a target image or video (with grayscale image(s)) as input to a colorization node on a node-based interface of the image/video editing application. The colorization node may represent a workflow, which when executed, may invokes the neural network-based colorization model to transfer a color effect from a ROI in the reference color image to object(s) in the frames of the target image/video.

Figure 1:
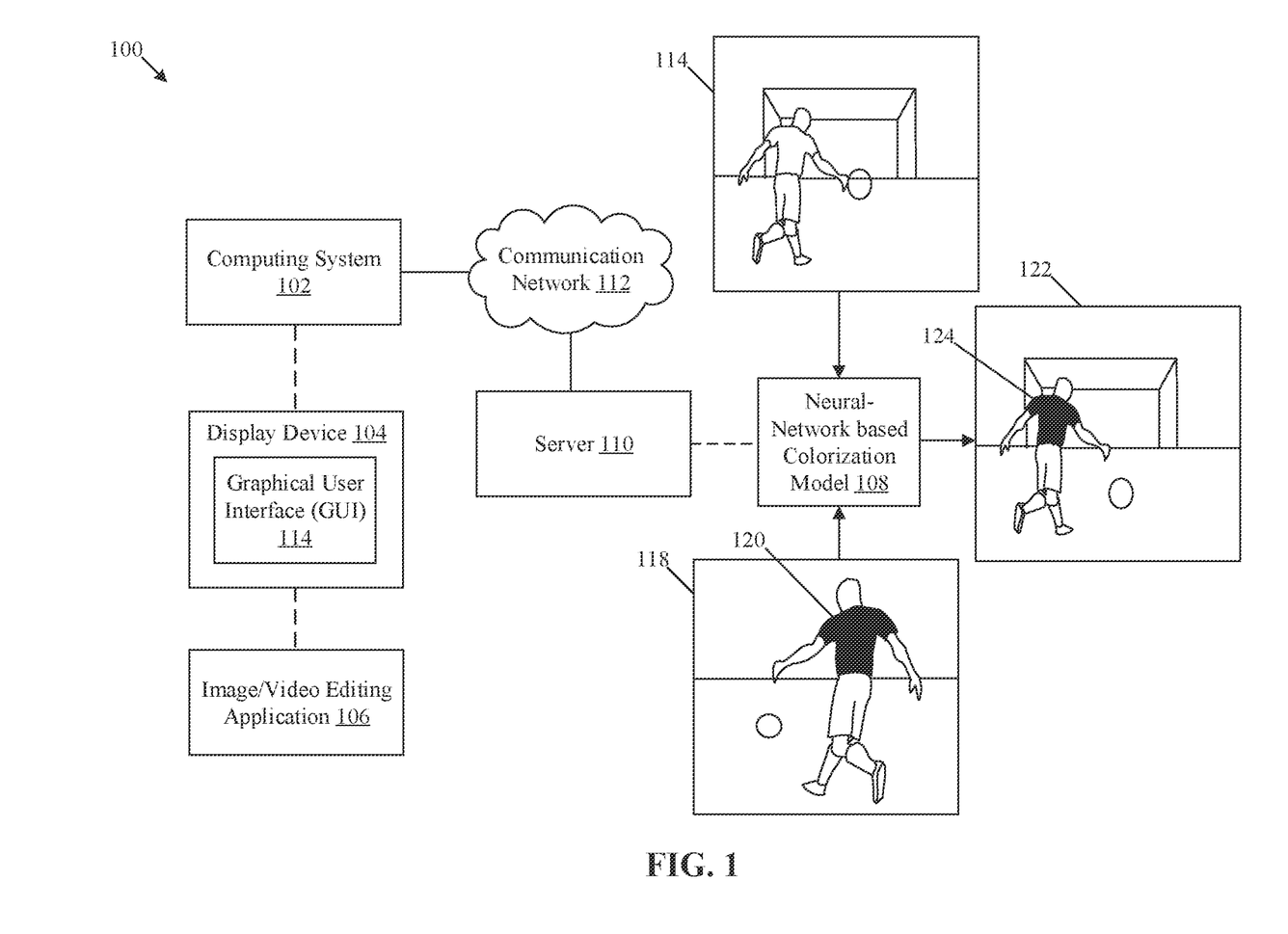
FIG. 1 is a block diagram that illustrates an exemplary network environment for neural network-based image colorization on image/video editing applications, in accordance with an embodiment of the disclosure.

FIG. 1 is a block diagram that illustrates an exemplary network environment for neural network-based image colorization on image/video editing applications, in accordance with an embodiment of the disclosure. With reference to FIG. 1, there is shown a network environment 100. The network environment 100 may include a computing system 102 and a display device 104 communicatively coupled to the computing system 102. There is further shown an image/video editing application 106, which may be installed on the computing system 102 or may be accessible through a web client, such as a web application or a web browser, on the computing system 102.

The network environment 100 may further include a server 110 which may implement a neural network-based colorization model 108. The server 110 may be communicatively coupled to the computing system 102 via a communication network 112. In FIG. 1, the computing system 102 and the display device 104 are shown as two separate devices; however, in some embodiments, the entire functionality of the display device 104 may be incorporated in the computing system 102, without a deviation from the scope of the disclosure.

The computing system 102 may include suitable logic, circuitry, code, and/or interfaces that may be configured to execute a first workflow for colorization of one or more objects in a first image feed which includes one or more grayscale images (such as a grayscale image 114). The first workflow may be associated with a software plugin, which may include program instructions for execution of the first workflow on the image/video editing application 106. Examples of the computing system 102 may include, but are not limited to, an image/video editing machine, a server, a computer work-station, a mainframe machine, a gaming device, a smartphone, a mobile phone, a laptop, a tablet, an extended reality (XR) headset, and/or any other consumer electronic (CE) device with image/video editing capability.

The display device 104 may include suitable logic, circuitry, and/or interfaces that may be configured to display a graphical user interface (GUI) 116 of the image/video editing application 106. In one embodiment, the display device 104 may be a touch-enabled device which may enable a user to provide a user input via the display device 104. The display device 104 may include a display unit that may be realized through several known technologies such as, but not limited to, at least one of a Liquid Crystal Display (LCD) display, a Light Emitting Diode (LED) display, a plasma display, or an Organic LED (OLED) display technology, or other display technologies.

The image/video editing application 106 may include suitable logic, code and/or interfaces that may be configured to edit an image feed comprising one or more grayscale images. For example, an edit may include application of a color effect on an input image using a rotoscoping method to obtain a reference color image (such as a reference color image 118). Another edit may include a transfer of the color effect from the reference color image to an object in a grayscale image (such as the grayscale image 114) of the image feed using a software plugin which may implement the neural network-based colorization model 108. The image/video editing application 106 may be implemented based on a node graph architecture. In the node graph architecture, a user may be able to construct a node graph to represent a workflow for any editing task, such as a colorization of the image feed based on the reference color image (such as the reference color image 118). Examples of the image/video editing application 106 may include, but are not limited to, a node-based digital compositing and visual effects application, an image editor, a digital effects application, a motion graphic editing application, a compositing application, a non-linear editing (NLE) application, a raster graphics editor, or a combination thereof.

The neural network-based colorization model 108 may be an image colorization model, which may be trained on an image colorization task to colorize objects in a single image frame or in a sequence of images frames of an image feed. The neural network-based colorization model 108 may be defined by its hyper-parameters, for example, activation function(s), number of weights, cost function, regularization function, input size, number of layers, and the like.

The neural network-based colorization model 108 may be referred to as a computational network or a system of artificial neurons (also referred to as nodes). The nodes of the neural network-based colorization model 108 may be arranged in a plurality of layers, as defined in a neural network topology of the neural network-based colorization model 108. The plurality of layers of the neural network-based colorization model 108 may include an input layer, one or more hidden layers, and an output layer. Each layer of the plurality of layers may include one or more nodes (or artificial neurons, represented by circles, for example). Outputs of all nodes in the input layer may be coupled to at least one node of hidden layer(s). Similarly, inputs of each hidden layer may be coupled to outputs of at least one node in other layers of the neural network-based colorization model 108. Outputs of each hidden layer may be coupled to inputs of at least one node in other layers of the neural network-based colorization model 108. Node(s) in the final layer may receive inputs from at least one hidden layer to output a result. The number of layers and the number of nodes in each layer may be determined from the hyper-parameters of the neural network-based colorization model 108. Such hyper-parameters may be set before or while training the neural network-based colorization model 108 on a training dataset of images.

Each node of the neural network-based colorization model 108 may correspond to a mathematical function (e.g., a sigmoid function or a rectified linear unit) with a set of parameters, tunable during training of the network. The set of parameters may include, for example, a weight parameter, a regularization parameter, and the like. Each node may use the mathematical function to compute an output based on one or more inputs from nodes in other layer(s) (e.g., previous layer(s)) of the neural network-based colorization model 108. All or some of the nodes of the neural network-based colorization model 108 may correspond to same or a different mathematical function.

In training of the neural network-based colorization model 108, one or more parameters of each node of the neural network-based colorization model 108 may be updated based on whether an output of the final layer for a given input (from the training dataset) matches a correct result based on a loss function for the neural network-based colorization model 108. The above process may be repeated for same or a different input till a minima of loss function is achieved, and a training error is minimized. Several methods for training are known in art, for example, gradient descent, stochastic gradient descent, batch gradient descent, gradient boost, meta-heuristics, and the like.

In an embodiment, the neural network-based colorization model 108 may include electronic data, which may be implemented as, for example, a software component of an application executable on the computing system 102 or the server 110. The neural network-based colorization model 108 may rely on libraries, external scripts, or other logic/instructions for execution by a processing device, such as the computing system 102 or the server 110. The neural network-based colorization model 108 may include computer-executable codes or routines to enable a computing device, such as the computing system 102 or the server 110 to perform one or more operations to colorize objects in input grayscale images. Additionally, or alternatively, the neural network-based colorization model 108 may be implemented using hardware including a processor, a microprocessor (e.g., to perform or control performance of one or more operations), a field-programmable gate array (FPGA), or an application-specific integrated circuit (ASIC). For example, an inference accelerator chip may be included in the computing system 102 to accelerate computations of the neural network-based colorization model 108 for the image colorization task. In some embodiments, the neural network-based colorization model 108 may be implemented using a combination of both hardware and software.

Examples of the neural network-based colorization model 108 may include, but are not limited to, an autoencoder, a convolutional neural network (CNN), Regions with CNN (R-CNN), Fast R-CNN, Faster R-CNN, a You Only Look Once (YOLO) network, a Residual Neural Network (ResNet), a Feature Pyramid Network (FPN), a Retina-Net, and/or a combination thereof.

The server 110 may include suitable logic, circuitry, and interfaces, and/or code that may be configured to implement the neural network-based colorization model 108 for colorization of grayscale image(s) using a reference color image (such as the reference color image 118). The server 110 may be a cloud server and may execute operations through web applications, cloud applications, HTTP requests, repository operations, file transfer, and the like. Other example implementations of the server 110 may include, but are not limited to, a web server, a file transfer protocol (FTP) server, an application server, or a mainframe server.

In at least one embodiment, the server 110 may be implemented as a plurality of distributed cloud-based resources by use of several technologies that are well known to those ordinarily skilled in the art. A person with ordinary skill in the art will understand that the scope of the disclosure may not be limited to the implementation of the server 110 and the computing system 102 as two separate entities. In certain embodiments, the functionalities of the server 110 can be incorporated in its entirety or at least partially in the computing system 102, without a departure from the scope of the disclosure.

The communication network 112 may include a communication medium through which the computing system 102 may communicate with the server 110 and other devices which are omitted from disclosure for the sake of brevity. The communication network 112 may be one of a wired connection or a wireless connection. Examples of the communication network 112 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the network environment 100 may be configured to connect to the communication network 112 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the computing system 102 may control the display device 104 to display the GUI 116 of the image/video editing application 106. The GUI 116 may include a node-based interface to create a workflow for an image processing task, such as an image colorization task or a rotoscoping task. For example, a user may have to simply place a set of image processing operations as nodes on the node-based interface. Thereafter, to obtain a workflow, such image operations may be linked together by connecting such nodes together on the node-based interface. Each of these operations may together produce a node graph.

At first, the computing system 102 may obtain a reference color image (such as the reference color image 118) by selective application of a color effect on a Region-of-Interest (ROI) (such as an ROI 120) of an input image. The computing system 102 may determine the ROI of the input image based on a user input via the GUI 116. For example, the GUI 116 may include a preview window that may display the input image. The user input may include addition of a number of points around the ROI in the input image to create a mask, which may separate the ROI from rest of elements in the input image. The user input may appear as a first node in the node-based interface of the GUI 116. In order to obtain the reference color image, the computing system 102 may be configured to apply the color effect on the ROI of the input image. The color effect may appear as a second node in the node-based interface of the GUI 116. In some instances, a set of image filters may be applied on the ROI, before or after the color effect is applied. Such filters may also appear as node(s) connected to the first node or the second node. All such nodes may form a node graph, which may represent an entire workflow which, when executed, may select the ROI and apply the set of image filters and the color effect on the selected ROI to obtain the reference color image (such as the ROI 120). Details on the reference color image are further provided, for example, in FIG. 4.

At any time-instant, the user may create a project on the image/video editing application 106. The computing system 102 may receive a user input to construct a first node graph via the node-based interface of the GUI 116. The computing system 102 may control the display device 104 to display the first node graph on the GUI 116 of the image/video editing application 106. The first node graph may include a colorization node which may represent a first workflow for colorization of at least a first object in one or more grayscale images (such as the grayscale image 114) of a first image feed. The first image feed may include a single image, or a sequence of image frames a video. Details associated with the first node graph are provided, for example, in FIG. 3.

The computing system 102 may receive a first user input, which may include a selection of the reference color image (such as the reference color image 118) via the image/video editing application 106. Thereafter, the computing system 102 may select the reference color image based on the first user input and may execute the first workflow associated with the colorization node. As the first workflow is initiated, the computing system 102 may feed the selected reference color image and the first image feed as an input to the neural network-based colorization model 108. The computing system 102 may receive a second image feed as an output of the neural network-based colorization model 108 for the input. The second image feed may include one or more colorized images (such as a colorized image 122). Each of such colorized images may include at least the first object (such as a t-shirt of a soccer-player 124) colorized based on color effect on the ROI (such as the ROI 120).

Figure 2:
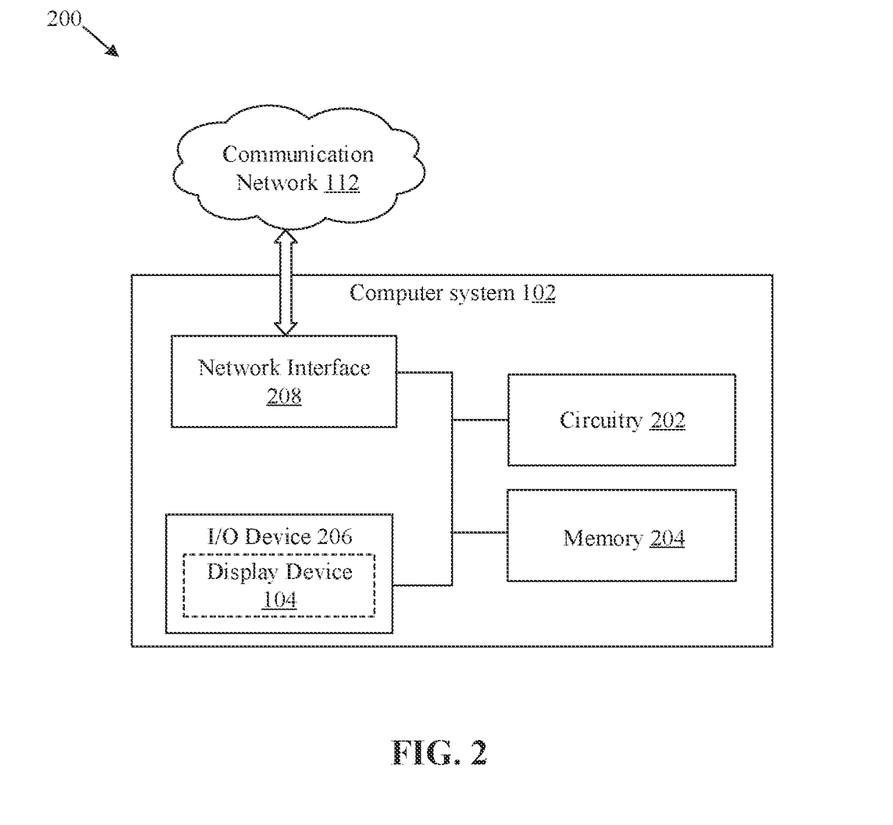
FIG. 2 is a block diagram that illustrates an exemplary computing system for neural network-based image colorization on image/video editing applications, in accordance with an embodiment of the disclosure.

FIG. 2 is a block diagram that illustrates an exemplary computing system for neural network-based image colorization on image/video editing applications, in accordance with an embodiment of the disclosure. FIG. 2 is explained in conjunction with elements from FIG. 1. With reference to FIG. 2, there is shown a block diagram 200 of the computing system 102. The computing system 102 may include circuitry 202, a memory 204, the Input/Output (I/O) device 206, and a network interface 208. The circuitry 202 may be communicatively coupled to the memory 204, the I/O device 206, and the network interface 208. In some embodiments, the I/O device 206 may include a display device (such as the display device 104 of FIG. 1).

The circuitry 202 may include suitable logic, circuitry, and/or interfaces that may be configured to execute program instructions associated with different operations to be executed by the computing system 102. The circuitry 202 may include one or more specialized processing units, which may be implemented as an integrated processor or a cluster of processors that perform the functions of the one or more specialized processing units, collectively. The circuitry 202 may be implemented based on a number of processor technologies known in the art. Examples of implementations of the circuitry 202 may be an x86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other computing circuits.

The memory 204 may include suitable logic, circuitry, and/or interfaces that may be configured to store program instructions to be executed by the circuitry 202. In at least one embodiment, the memory 204 may be configured to store a reference color image (such as the reference color image 118) and a first image feed (such as the grayscale image 114). The memory 204 may be further configured to store a set of color effects to be used on the ROI (such as the ROI 120) of the input image. Example implementations of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, interfaces, and/or code that may be configured to receive an input and provide an output based on the received input. The I/O device 206 may include various input and output devices, which may be configured to communicate with the circuitry 202. For example, the computing system 102 may receive a user input via the I/O device 206 to select a reference color image, an ROI from the input image, and to apply a color effect on the selected ROI of the input image. Examples of the I/O device 206 may include, but are not limited to, a touch screen, a keyboard, a mouse, a joystick, a display device (for example, the display device 104), a microphone, or a speaker.

The network interface 208 may include suitable logic, circuitry, interfaces, and/or code that may be configured to facilitate the circuitry 202 to communicate with the server 110, the display device 104 and/or other communication devices, via the communication network 112. The network interface 208 may be implemented by use of various known technologies to support wireless communication of the computing system 102 via communication network 112. The network interface 208 may include, for example, an antenna, a radio frequency (RF) transceiver, one or more amplifiers, a tuner, one or more oscillators, a digital signal processor, a coder-decoder (CODEC) chipset, a subscriber identity module (SIM) card, a local buffer circuitry, and the like.

The network interface 208 may be configured to communicate via wireless communication with networks, such as the Internet, an Intranet, a wireless network, a cellular telephone network, a wireless local area network (LAN), or a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), or Worldwide Interoperability for Microwave Access (Wi-MAX).

The functions or operations executed by the computing system 102, as described in FIG. 1, may be performed by the circuitry 202. Operations executed by the circuitry 202 are described in detail, for example, in FIGS. 3 and 4.

Figure 3:
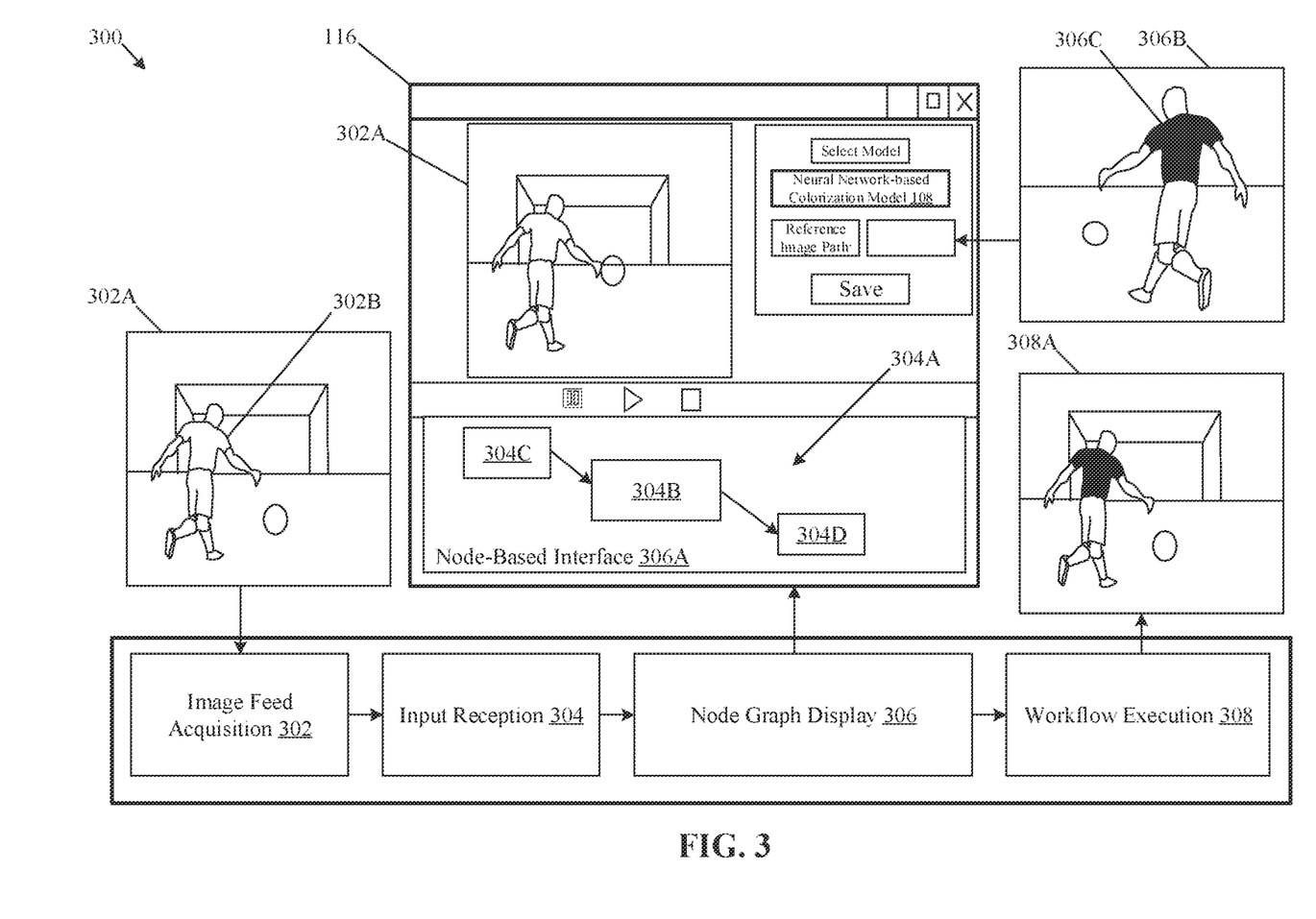
FIG. 3 is a diagram that illustrates exemplary operations for colorization of a grayscale image feed using a neural network-based colorization plugin on an image/video editing application, in accordance with an embodiment of the disclosure.

FIG. 3 is a diagram that illustrates exemplary operations for colorization of a grayscale image feed using a neural network-based colorization plugin on an image/video editing application, in accordance with an embodiment of the disclosure. FIG. 3 is explained in conjunction with elements from FIG. 1 and FIG. 2. With reference to FIG. 3, there is shown a block diagram 300 that illustrates exemplary operations from 302 to 308, as described herein. The exemplary operations illustrated in block diagram 300 may start at 302 and may be performed by any computing system, apparatus, or device, such as by the computing system 102 of FIG. 1 or FIG. 2.

At 302, a first image feed may be acquired. The circuitry 202 may acquire the first image feed from a data source. The data source may be, for example, an onboard image sensor of the computing system 102, a persistent storage on the computing system 102, an image capture device, a cloud server, or a combination thereof. The first image feed may include one or more grayscale images (such as a grayscale image 302A), each of which may include at least a first object (such as a soccer-player 302B). The first image feed may represent a static scene with a static foreground or background or may represent a dynamic scene with one or more moving objects.

At 304, an input may be received to construct a first node graph 304A for colorization of the first image feed. For example, the input may be a user input, which may include a selection of an option to create a project on the image/video editing application 106. When the GUI 116 displays a project window for the created project, the user input may include a selection of nodes, such as a colorization node 304B, a source node 304C, and a result node 304D via a toolbar accessible on the GUI 116 of the image/video editing application 106.

At 306, the constructed first node graph 304A may be displayed. The circuitry 202 may control the display device 104 to display the constructed first node graph 304A on the GUI 116 of the image/video editing application 106. For example, the GUI 116 may include a node-based interface 306A, which may be updated to include the colorization node 304B between the source node 304C and the result node 304D. While the result node 304D may be linked to an output of the colorization node 304B, the source node 304C may be linked to the first image feed (includes the grayscale image 302A, for example) and a reference color image 306B. The circuitry 202 may select the reference color image 306B based on a first user input.

The first node graph 304A may include the colorization node 304B, which may represent (or may be linked to) a first workflow for colorization of a first object (such as a soccer-player 302B) in one or more grayscale images of the first image feed. In an embodiment, the colorization node may correspond to a software plugin which may include program instructions for execution of the first workflow. A user may be able to select and add the software plugin as a colorization node in the node-based interface of the GUI 116.

In an embodiment, the circuitry 202 may control the display device to display a setting of the colorization node on the GUI 116 of the image/video editing application 106. For example, the setting may be displayed based on a user selection of an option displayed along with the colorization node 304B. The setting may include a set of options corresponding to a set of neural network-based colorization models. The circuitry 202 may receive a user input, which may include a selection of a first option of the set of options. The circuitry 202 may select the neural network-based colorization model 108 from among the set of neural network-based colorization models, based on the received user input.

At 308, the first workflow may be executed. At any time-instant, the circuitry 202 may execute the first workflow associated with the colorization node 304B. When executed, the circuitry 202 may feed the selected reference color image 306B and the first image feed (such as the grayscale image 302A) as an input to the selected neural network-based colorization model 108. Thereafter, the circuitry 202 may receive, as an output of the selected neural network-based colorization model 108, a second image feed. For example, the second image feed may include one or more colorized images (such as a colorized image 308A). Each of the one or more colorized images may include at least a first object (such as the soccer-player 302B) colorized based on the color effect on a ROI 306C in the reference color image 306B.

In an embodiment, the neural network-based colorization model 108 may transfer the color effect from the ROI 306C of the reference color image 306B to at least the first object (such as the soccer-player 302B) in each of the one or more grayscale images of the first image feed, to output the second image feed (which includes one or more colorized images, such as the colorized image 308A). As shown, for example, the black color on the shirt of a soccer-player (i.e. the ROI 306C) may be transferred to the shirt worn by the soccer-player 302B in the grayscale image 302A of the first image feed. In an embodiment, the circuitry 202 may control the display device 104 to display the second image feed on the GUI 116 of the image/video editing application 106.

Although illustrated with discrete blocks, the exemplary operations associated with one or more blocks of the flowchart 500 may be divided into additional blocks, combined into fewer blocks, or eliminated, depending on implementation of the exemplary operations.

Figure 4:
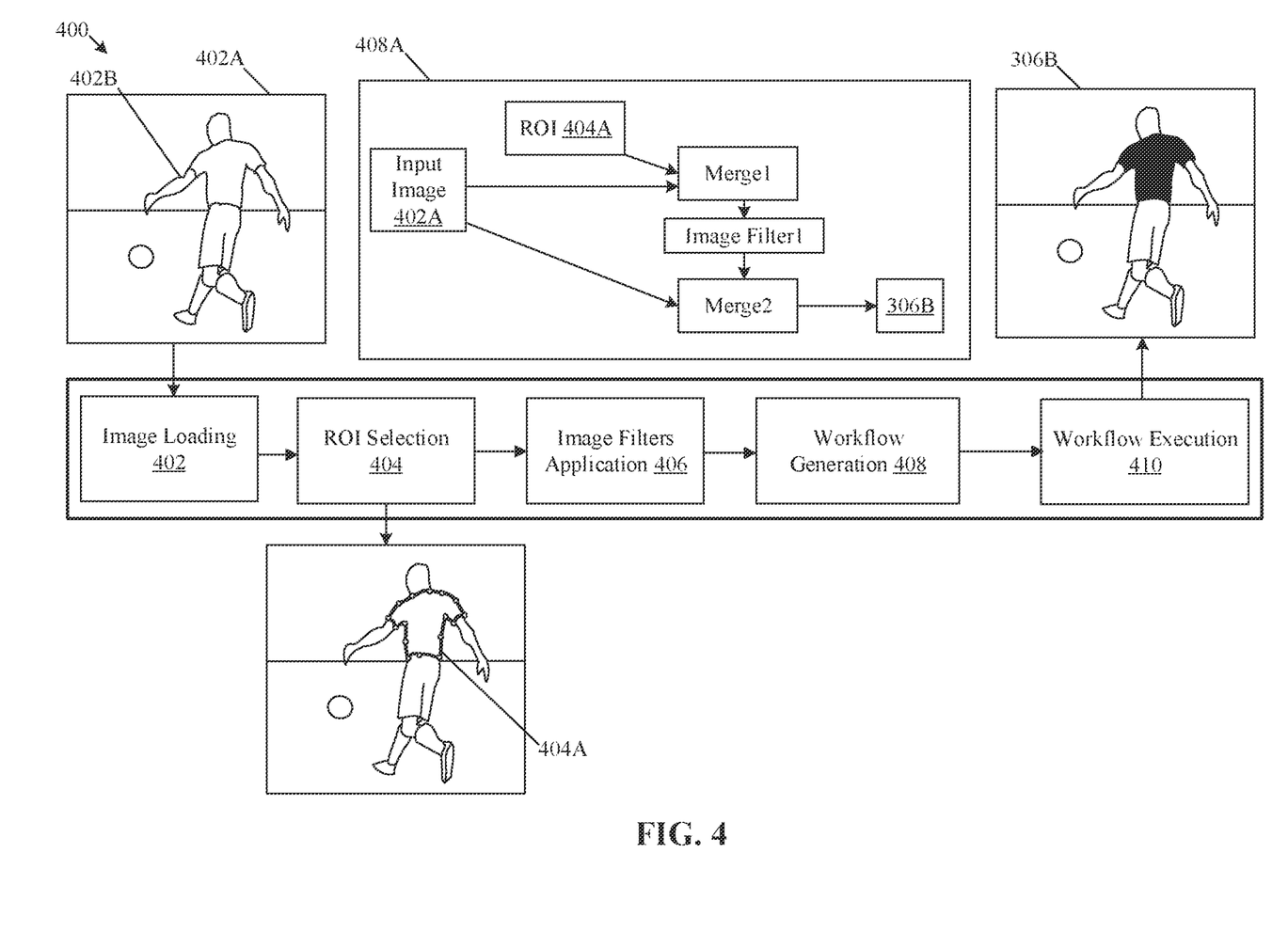
FIG. 4 is a diagram that illustrates exemplary operations for obtaining a reference color image for use in the exemplary operations of FIG. 3, in accordance with an embodiment of the disclosure.

FIG. 4 is a diagram that illustrates exemplary operations for obtaining a reference color image for use in the exemplary operations of FIG. 3, in accordance with an embodiment of the disclosure. FIG. 4 is explained in conjunction with elements from FIGS. 1, 2, and 3. With reference to FIG. 4, there is shown a block diagram 400 that illustrates exemplary operations from 402 to 410, as described herein. The exemplary operations illustrated in block diagram 400 may start at 402 and may be performed by any computing system, apparatus, or device, such as the computing system 102 of FIG. 1 or FIG. 2.

At 402, an input image 402A may be loaded on the GUI 116 of the image/video editing application 106. The input image 402A may be a color image with at least one object of interest, for example, a soccer-player 402B.

At 404, an ROI 404A of the input image 402A may be selected. Such selection may be based on a user input via the GUI 116. For example, the input image to be used as a starting point for segmentation may be loaded on the GUI 116 and a segmentation tool of the image/video editing application 106 may be used to select the ROI 404A. As shown, for example, an ROI around the shirt of the soccer-player 402B may be selected by placing points around the edge of the shirt. The selection of the ROI 404A may be displayed as a node in the node-based interface of the GUI 116.

At 406, a first set of image filters may be selected for the selected ROI 404A. Such filters may include, for example, a hue shift operation, an alpha blending or alpha compositing operators, and the like. Such filters may be selected via a menu displayed on the GUI 116 of the image/video editing application 106. In at least one embodiment, such filters may specify a color effect to be applied on the ROI 404A based on modification of color values in one or more color channels of the selected ROI 404A.

At 408, a second workflow may be generated for obtaining the reference color image 306B. Operations from 402 to 406 may be performed to generate the second workflow which may be represented by a second node graph 408A. In an embodiment, the circuitry 202 may control the display device 104 to display the second node graph 408A on the GUI 116 of the image/video editing application 106. The second node graph 408A may represent a second workflow to obtain the reference color image 306B from the input image 402A. The input image 402A and all the operations from 402 to 406 may be included in the second node graph 408A as nodes, which may be connected together to form the second node graph 408A.

At 410, the second workflow, i.e. the node-based workflow associated with the second node graph 408A may be executed. When executed, the circuitry 202 may select the ROI 404A from the input image 402A. For example, the node associated with the selection of the ROI 404A may load a mask, drawn by a user around the ROI 404A of the input image 402A using a segmentation tool, such as a digital rotoscoping tool. Detailed implementation of a rotoscoping tool may be known to one skilled in the art, and therefore, a detailed description for the rotoscoping tool 408 has been omitted from the disclosure for the sake of brevity. After the selection is made, the circuitry 202 may apply the selected first set of image filters on the selected ROI 404A and may apply a color effect on the selected ROI 404A of the input image 402A to obtain the reference color image 306B based on the application of the first set of image filters. By way of example, and not limitation, the application of the color effect may modify at least one of: a color saturation, a brightness, a contrast, color values in specific color channels of the selected ROI 404A, a gamma or tonal change of the selected ROI 404A in the input image 402A.

As shown, for example, the second node graph 408A may include the input image 402A as a source node, which may be connected to a first merge node (represented by "Merge 1"). The first merge node may be further connected to an ROI node (represented by "ROI"). The first merge node may generate a mask by combining the selection around the ROI 404A with input image 402A. The mask may remove all other regions except the ROI 404A from the input image 402A. An image filter, such as a filter to modify a color channel (such as green), may be applied to the ROI 404A (which is the output of the first merge node) to obtain a modified ROI. The input image 402A along with the modified ROI may be passed as input to a second merge node (represented by "Merge 2"), which may overlay the modified ROI on the input image 402A to output the reference color image 306B.

As shown, for example, the reference color image 306B includes a black color on the shirt (i.e. the selected ROI 404A) of the soccer-player. The black color may be applied as the color effect on the ROI 404A of the input image 402A. The image/video editing application 106 may allow an end user to control and modify the reference color image 306B using a rotoscoping workflow. The reference color image 306B may be saved on the computing system 102, to be later used to colorize an image feed of grayscale images, as described in FIG. 3, for example.

Although illustrated with discrete blocks, the exemplary operations associated with one or more blocks of the block diagram 400 may be divided into additional blocks, combined into fewer blocks, or eliminated, depending on implementation of the exemplary operations.

Figure 5:
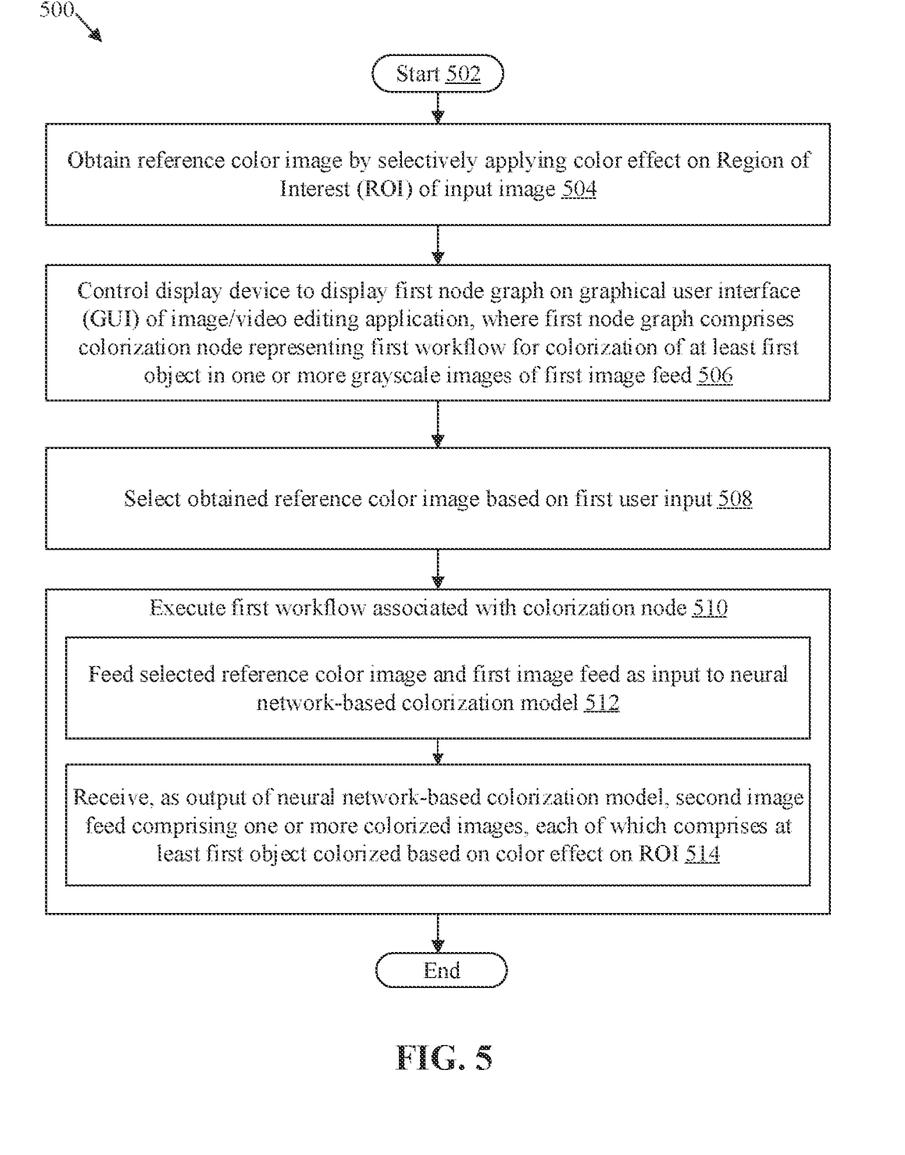
FIG. 5 is a flowchart that illustrates an exemplary method for neural network-based image colorization on image/video editing applications, in accordance with an embodiment of the disclosure.

FIG. 5 is a flowchart that illustrates an exemplary method for neural network-based image colorization on image/video editing applications, in accordance with an embodiment of the disclosure. FIG. 5 is explained in conjunction with elements from FIGS. 1, 2, 3, and 4. With reference to FIG. 5, there is shown a flowchart 500. The method illustrated in the flowchart 500 may be executed by any computing system, such as by the computing system 102 or the circuitry 202. The method may start at 502 and proceed to 504.

At 504, a reference color image (such as the reference color image 118) may be obtained. In one or more embodiments, the circuitry 202 may be configured to obtain the reference color image by selectively applying a color effect on am ROI (such as the ROI 120) of an input image (such as the input image 402A). Details related to the reference color image, are described, for example, in FIG. 4.

At 506, a display device (such as the display device 104) may be controlled to display a first node graph (such as the first node graph 304A). In one or more embodiments, the circuitry 202 may be configured to control the display device 104 to display the first node graph on the GUI 116 of the image/video editing application 106. The first node graph may include a colorization node (such as the colorization node 304B) representing a first workflow for colorization of at least a first object (such as the soccer-player 302B) in one or more grayscale images (such as the grayscale image 302A) of a first image feed.

At 508, the obtained reference color image may be selected. In one or more embodiments, the circuitry 202 may be configured to select the obtained reference color image based on a first user input. Details of selection of the reference color image are described, for example, in FIG. 3.

At 510, the first workflow may be executed. In one or more embodiments, the circuitry 202 may be configured to execute the first workflow associated with the colorization node (such as the colorization node 304B). Details of the execution of the first workflow are described, for example, in FIG. 3.

At 512, the selected reference color image and the first image feed may be fed as an input to the neural network-based colorization model 108. In one or more embodiments, the circuitry 202 may be configured to feed the selected reference color image and the first image feed as an input to the neural network-based colorization model 108, as described, for example, in FIG. 3.

At 514, a second image feed may be received. In one or more embodiments, the circuitry 202 may be configured to receive, as an output of the neural network-based colorization model 108, the second image feed including one or more colorized images (such as the colorized image 308A), each of which may include at least the first object colorized based on color effect on the ROI (such as the ROI 306C). Control may pass to end.

Although the flowchart 500 is illustrated as discrete operations, such as 502, 504, 506, 508, 510, 512 and 514, the disclosure is not so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory computer readable medium and/or storage medium having stored thereon, instructions executable by a machine and/or a computer to operate a computing system (such as the computing system 102). The instructions may cause the machine and/or computer to perform operations that include obtaining a reference color image (such as the reference color image 118) based on a selective application of a color effect on a region of interest (ROI) (such as the ROI 120) of an input image (such as the input image 402A). The operations may further include controlling a display device (such as the display device 104) to display a first node graph (such as the first node graph 304A) on a Graphical User Interface (GUI) (such as the GUI 116) of an image/video editing application (such as the image/video editing application 106). The first node graph may include a colorization node (such as the colorization node 304B) representing a first workflow for colorization of at least a first object (such as a t-shirt of the soccer-player 302B) in one or more grayscale images (such as a grayscale image 302A) of a first image feed. The operations may further include selecting the obtained reference color image based on a first user input and executing the first workflow associated with the colorization node. The execution includes feeding the selected reference color image and the first image feed as an input to a neural network-based colorization model (such as the neural network-based colorization model 108), and receiving, as an output of the neural network-based colorization model 108 for the input, a second image feed including one or more colorized images (such as the colorized image 308A), each of which comprises at least the first object colorized based on color effect on the ROI.

Exemplary aspects of the disclosure may provide a computing system (such as the computing system 102 of FIG. 1) that includes circuitry (such as the circuitry 202). The circuitry 202 may be configured to obtain a reference color image (such as the reference color image 118) based on a selective application of a color effect on a region of interest (ROI) (such as the ROI 120) of an input image (such as the input image 402A). The circuitry 202 may be configured to control a display device to display device (such as the display device 104) to display a first node graph (such as the first node graph 304A) on a Graphical User Interface (GUI) (such as the GUI 116) of an image/video editing application (such as the image/video editing application 106). The first node graph may include a colorization node (such as the colorization node 304B) representing a first workflow for colorization of at least a first object (such as a t-shirt of the soccer-player 302B) in one or more grayscale images of a first image feed. The circuitry 202 may be configured to select the obtained reference color image based on a first user input and execute the first workflow associated with the colorization node by feeding the selected reference color image and the first image feed as an input to a neural network-based colorization model (such as the neural network-based colorization model 108), and receiving, as an output of the neural network-based colorization model 108 for the input, a second image feed including one or more colorized images (such as the colorized image 308A). Each of the one or more colorized images may include at least the first object colorized based on color effect on the ROI of the reference color image.

In accordance with an embodiment, the circuitry 202 is further configured to control the display device to display a second node graph (such as the second node graph 408A) on the GUI of the image/video editing application. The second node graph may represent a second workflow to obtain the reference color image from the input image.

In accordance with an embodiment, the circuitry 202 is further configured to execute the second workflow by selecting the ROI from the input image, applying a first set of image filters on the selected ROI, and applying the color effect on the selected ROI of the input image based on the application of the first set of image filters, to obtain the reference color image.

In accordance with an embodiment, the colorization node corresponds to a software plugin which includes program instructions for execution of the first workflow. In accordance with an embodiment, the circuitry 202 is further configured to control the display device 104 to display a setting of the colorization node on the GUI of the image/video editing application. The setting may include a set of options corresponding to a set of neural network-based colorization models. The circuitry 202 may be further configured to receive a second user input comprising a selection of a first option of the set of options. The circuitry 202 may be further configured to select the neural network-based colorization model from among the set of neural network-based colorization models, based on the second user input.

In accordance with an embodiment, the neural network-based colorization model transfers the color effect on the ROI of the reference color image to at least the first object (such as the t-shirt of the soccer-player 302B) in each of the one or more grayscale images of the first image feed, to output the second image feed including the one or more colorized images (such as the colorized image 308A).

In accordance with an embodiment, the circuitry 202 may be further configured to control the display device 104 to display the second image feed on the GUI of the image/video editing application.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the particular embodiment disclosed, but that the present disclosure will include all embodiments that fall within the scope of the appended claims.

What is claimed is:

1. A method, comprising:
in a computing system:
obtaining a reference color image by selectively applying a color effect on a region of interest (ROI) of an input image;
controlling a display device to display a first node graph on a Graphical User Interface (GUI) of an image/video editing application, wherein
the first node graph comprises a colorization node representing a first workflow for colorization of at least a first object in one or more grayscale images of a first image feed;
selecting the obtained reference color image based on a first user input; and
executing the first workflow associated with the colorization node, the executing comprising:
feeding the selected reference color image and the first image feed as an input to a neural network-based colorization model; and
receiving, as an output of the neural network-based colorization model for the input, a second image feed comprising one or more colorized images, each of which comprises at least the first object colorized based on color effect on the ROI.

2. The method according to claim 1, further comprising:
controlling the display device to display a second node graph on the GUI of the image/video editing application,
wherein the second node graph represents a second workflow for obtaining the reference color image from the input image.

3. The method according to claim 2, further comprising executing the second workflow, the executing comprising:
selecting the ROI from the input image;
applying a first set of image filters on the selected ROI; and
based on the application of the first set of image filters, applying the color effect on the selected ROI of the input image to obtain the reference color image.

4. The method according to claim 1, wherein the colorization node corresponds to a software plugin which includes program instructions for execution of the first workflow.

5. The method according to claim 1, further comprising:
controlling the display device to display a setting of the colorization node on the GUI of the image/video editing application,
wherein the setting includes a set of options corresponding to a set of neural network-based colorization models;
receiving a second user input comprising a selection of a first option of the set of options; and
selecting the neural network-based colorization model from among the set of neural network-based colorization models, based on the second user input.

6. The method according to claim 1, wherein the neural network-based colorization model transfers the color effect on the ROI of the reference color image to at least the first object in each of the one or more grayscale images of the first image feed, to output the second image feed comprising the one or more colorized images.

7. The method according to claim 1, further comprising controlling the display device to display the second image feed on the GUI of the image/video editing application.

8. A computing system, comprising:
circuitry configured to:
obtain a reference color image based on a selective application of a color effect on a region of interest (ROI) of an input image;
control a display device to display a first node graph on a Graphical User Interface (GUI) of an image/video editing application, wherein
the first node graph comprises a colorization node which represents a first workflow for colorization of at least a first object in one or more grayscale images of a first image feed;
select the obtained reference color image based on a first user input; and
execute the first workflow associated with the colorization node by:
feeding the selected reference color image and the first image feed as an input to a neural network-based colorization model; and
receiving, as an output of the neural network-based colorization model for the input, a second image feed comprising one or more colorized images, each of which comprises at least the first object colorized based on color effect on the ROI.

9. The computing system according to claim 8, wherein the circuitry is further configured to control the display device to display a second node graph on the GUI of the image/video editing application, and
wherein the second node graph represents a second workflow to obtain the reference color image from the input image.

10. The computing system according to claim 9, wherein the circuitry is further configured to execute the second workflow by:
selecting the ROI from the input image;
applying a first set of image filters on the selected ROI; and
based on the application of the first set of image filters, applying the color effect on the selected ROI of the input image to obtain the reference color image.

11. The computing system according to claim 8, wherein the colorization node corresponds to a software plugin which includes program instructions for execution of the first workflow.

12. The computing system according to claim 8, wherein the circuitry is further configured to:
control the display device to display a setting of the colorization node on the GUI of the image/video editing application,
wherein the setting includes a set of options corresponding to a set of neural network-based colorization models;
receive a second user input comprising a selection of a first option of the set of options; and
select the neural network-based colorization model from among the set of neural network-based colorization models, based on the second user input.

13. The computing system according to claim 8, wherein the neural network-based colorization model transfers the color effect on the ROI of the reference color image to at least the first object in each of the one or more grayscale images of the first image feed, to output the second image feed comprising the one or more colorized images.

14. The computing system according to claim 8, wherein the circuitry is further configured to control the display device to display the second image feed on the GUI of the image/video editing application.

15. A non-transitory computer-readable medium having stored thereon, computer-executable instructions which, when executed a computing system, causes the computing system to execute operations, the operations comprising:
obtaining a reference color image by selectively applying a color effect on a region of interest (ROI) of an input image;
controlling a display device to display a first node graph on a Graphical User Interface (GUI) of an image/video editing application, wherein
the first node graph comprises a colorization node representing a first workflow for colorization of at least a first object in one or more grayscale images of a first image feed;
selecting the obtained reference color image based on a first user input; and
executing the first workflow associated with the colorization node, the executing comprising:
feeding the selected reference color image and the first image feed as an input to a neural network-based colorization model; and
receiving, as an output of the neural network-based colorization model for the input, a second image feed comprising one or more colorized images, each of which comprises at least the first object colorized based on color effect on the ROI.

16. The non-transitory computer-readable medium according to claim 15, wherein the operations further comprise controlling the display device to display a second node graph on the GUI of the image/video editing application, and
wherein the second node graph represents a second workflow for obtaining the reference color image from the input image.

17. The non-transitory computer-readable medium according to claim 16, wherein the operations further comprise executing the second workflow, the executing comprising:
selecting the ROI from the input image;
applying a first set of image filters on the selected ROI; and
based on the application of the first set of image filters, applying the color effect on the selected ROI of the input image to obtain the reference color image.

18. The non-transitory computer-readable medium according to claim 15, wherein the colorization node corresponds to a software plugin which includes program instructions for execution of the first workflow.

19. The non-transitory computer-readable medium according to claim 15, wherein the operations further comprise:
controlling the display device to display a setting of the colorization node on the GUI of the image/video editing application,
wherein the setting includes a set of options corresponding to a set of neural network-based colorization models;

receiving a second user input comprising a selection of a first option of the set of options; and selecting the neural network-based colorization model from among the set of neural network-based colorization models, based on the second user input.

20. The non-transitory computer-readable medium according to claim 15, wherein the neural network-based colorization model transfers the color effect on the ROI of the reference color image to at least the first object in each of the one or more grayscale images of the first image feed, to output the second image feed comprising the one or more colorized images.

* * * * *